(12) United States Patent
Kuckelkorn et al.

(10) Patent No.: US 10,458,680 B2
(45) Date of Patent: Oct. 29, 2019

(54) METHOD AND DEVICE FOR DISCHARGING A HYDROGEN STORAGE SYSTEM IN PARABOLIC TROUGH RECEIVERS

(71) Applicant: SCHOTT AG, Mainz (DE)

(72) Inventors: Thomas Kuckelkorn, Jena (DE); Oliver Sohr, Weiden (DE)

(73) Assignee: SCHOTT AG, Mainz (DE)

( * ) Notice: Subject to any disclaimer, the term of this patent is extended or adjusted under 35 U.S.C. 154(b) by 334 days.

(21) Appl. No.: 15/422,346

(22) Filed: Feb. 1, 2017

(65) Prior Publication Data

US 2017/0219251 A1 Aug. 3, 2017

(30) Foreign Application Priority Data

Feb. 3, 2016 (DE) .................... 10 2016 201 654

(51) Int. Cl.
*F24S 40/46* (2018.01)
*F24S 10/40* (2018.01)
*B23K 26/21* (2014.01)
*B23K 26/382* (2014.01)
*F24S 25/60* (2018.01)
*F24S 80/70* (2018.01)

(52) U.S. Cl.
CPC .............. *F24S 40/46* (2018.05); *B23K 26/21* (2015.10); *B23K 26/382* (2015.10); *F24S 10/45* (2018.05); *F24S 80/70* (2018.05); *F24S 2025/6013* (2018.05); *Y02E 10/44* (2013.01)

(58) Field of Classification Search
CPC ................ F24J 2/05; F24J 2/055; F26S 40/06
USPC .......................................... 126/635, 651–654
See application file for complete search history.

(56) References Cited

U.S. PATENT DOCUMENTS

| 4,455,998 | A | * | 6/1984 | Kroontje | G05D 23/01 126/635 |
| 4,637,374 | A | | 1/1987 | Arai | |
| 4,708,124 | A | * | 11/1987 | Dorbeck | F24S 80/10 126/654 |
| 4,886,048 | A | * | 12/1989 | Labaton | F04F 9/00 165/104.27 |
| 5,041,715 | A | * | 8/1991 | Muller | B23K 26/12 219/121.64 |

(Continued)

FOREIGN PATENT DOCUMENTS

| CN | 202008244 | 10/2011 |
| CN | 103673350 | 3/2014 |

(Continued)

*Primary Examiner* — Vivek K Shirsat
(74) *Attorney, Agent, or Firm* — Ohlandt, Greeley, Ruggiero & Perle, L.L.P.

(57) ABSTRACT

The present disclosure describes a method for discharging a hydrogen storage system, which is found in the annular space of a receiver tube, in particular for solar collectors, wherein the annular space is formed between an outer-lying tubular jacket and an inner-lying absorber tube of the receiver tube, and the outer-lying tubular jacket is connected via a wall to the absorber tube in a gas-tight manner. The method is hereby characterized in that an opening penetrating the tubular jacket or the wall is produced, free hydrogen in the annular space is pumped out through the opening, and the opening is subsequently sealed. The disclosure further describes a device for implementing the method.

22 Claims, 3 Drawing Sheets

(56) References Cited

U.S. PATENT DOCUMENTS

| | | | |
|---|---|---|---|
| 5,192,846 A | * | 3/1993 | Duthoo ................ B23K 26/032 219/121.63 |
| 2007/0034204 A1 | | 2/2007 | Kuckelkorn et al. |
| 2007/0235024 A1 | | 10/2007 | Kuckelkorn et al. |
| 2012/0017887 A1 | | 1/2012 | Ahnert et al. |
| 2012/0211003 A1 | | 8/2012 | Kuckelkorn |
| 2014/0345600 A1 | | 11/2014 | Mollenhoff |
| 2017/0108244 A1 | | 4/2017 | Matsudo |

FOREIGN PATENT DOCUMENTS

| | | |
|---|---|---|
| CN | 203687399 | 7/2014 |
| DE | 19821137 | 11/1999 |
| DE | 102005022183 | 8/2006 |
| DE | 102005057276 | 7/2007 |
| DE | 102009017741 | 7/2010 |
| DE | 102011082772 | 4/2013 |
| ES | 2375006 | 2/2012 |
| ES | 2487441 | 8/2014 |
| JP | S57128053 | 8/1982 |
| JP | 2014006018 | 1/2014 |
| WO | 2004063640 | 7/2004 |
| WO | 2015151774 | 10/2015 |

* cited by examiner

METHOD AND DEVICE FOR DISCHARGING A HYDROGEN STORAGE SYSTEM IN PARABOLIC TROUGH RECEIVERS

CROSS-REFERENCE TO RELATED APPLICATIONS

The present application claims priority to German Patent Application No. 10 2016 201 654.7, filed on Feb. 3, 2016, which is herein incorporated by reference.

BACKGROUND OF THE DISCLOSURE

1. Field of the Disclosure

The present disclosure relates to a method for discharging a hydrogen storage system, which is present in the annular space of a receiver tube, wherein the annular space is formed between an outer-lying tubular jacket and an inner-lying absorber tube of the receiver tube, and the outer-lying tubular jacket is joined to the absorber tube via a wall in a gas-tight manner. The wall is generally composed of metal and includes a glass-metal transition element and an expansion compensating element as well as other connection elements. Furthermore, the disclosure relates to a device for discharging a hydrogen storage system that is present in the annular space of the receiver tube.

2. Background of the Disclosure

Solar collectors comprise a collector mirror—for example, a parabolic cylindrical mirror (parabolic trough)—and a receiver tube, and are utilized in solar thermal power plants preferably for the generation of electricity. The receiver tube is arranged in the focal line of each collector mirror and is generally composed of an absorber tube made of steel, which has a radiation-absorbing layer, and a tubular jacket made of glass, which surrounds the absorber tube and thermally insulates it. In the known solar thermal power plants, a thermal oil, which is utilized as a heat transfer medium, is carried through the absorber tube and can be heated to a temperature of about 400° C. by means of the solar radiation reflected from the collector mirrors and focused on the absorber tube. The energy stored in the heat transfer medium is released via a heat exchanger into a steam circuit and converted to electrical energy in a turbine.

An annular space is formed in the receiver tube between the absorber tube and the tubular jacket. This annular space serves to minimize heat losses at the outer surface of the absorber tube and thereby to increase the efficiency of the solar collector. For this purpose, the annular space is evacuated, so that heat can be emitted from the absorber tube to the greatest extent possible only in the form of radiation.

The thermal oil utilized as the heat transfer medium in the absorber tube exhibits a temperature-dependent aging and a decomposition rate associated therewith. The decomposition of the heat transfer medium in the long run leads to the formation of various decomposition products, which include, among others, hydrogen. The amount released during the aging process depends, on the one hand, on the thermal oil used and the operating conditions in the solar thermal power plants and, on the other hand, on the degree of purity of the heat transfer medium.

By way of permeation, the hydrogen released by decomposition of the heat transfer medium partially enters the evacuated annular space of the receiver. Because the hydrogen permeability of glass is less than that of steel by orders of magnitude, the hydrogen accumulates in the annular space. In consequence, the pressure in the annular space rises and the thermal conductivity of the annular space increases as well. This occurs until an equilibrium prevails between the partial pressures of hydrogen in the absorber tube and in the annular space. It is especially a drawback in this case that hydrogen has a higher thermal conductivity than air, for example, so that, as hydrogen permeation progresses further, the thermal conductivity in the annular space is even better than that of the air outside the receiver tube. In consequence, the efficiency of the receiver tube drops and hence so does that of the complete solar collector.

In order to counteract this increase in the partial pressure of hydrogen in the annular space and thereby maintain the high efficiency of the receiver tube, various solutions are known from the prior art.

Known from DE 10 2009 017 741 A1, for example, is a receiver tube, which comprises a valve arrangement that extends through the wall of the tubular jacket into the annular space. This valve arrangement makes it possible to flush the annular space or to evacuate it whenever a large proportion of interfering substances, such as hydrogen, for example, has accumulated.

In addition, the hydrogen that has diffused into the annular space can be bound by means of a getter. However, the absorption capacity of such materials is limited, so that, once a material-specific maximum absorption capacity has been attained, no further hydrogen can be bound and the pressure in the annular space increases once again.

Receiver tubes with a getter material arranged in the annular space are known from WO 2004/063640 A1, for example. In the device described in this specification, the getter material is arranged in getter bridges between the absorber tube and the tubular jacket directly in the annular space. The getter bridge produces a spacing between the absorber tube and the getter, so that the thermal load on the getter is reduced and its absorption capacity is thereby improved. However, apart from the use of a getter material, no other solution for diminishing the hydrogen concentration in the annular space has been provided, so that the drawbacks of the getter described above still remain.

In order to alleviate the problem of getter materials, DE 198 21 137 A1 discloses a receiver tube for solar thermal applications, in which, in addition, noble gas with a partial pressure of up to several hundred mbars is present in the annular space. The advantage of this solution is that many noble gases have a lower thermal conductivity than air, so that the thermal conduction through the annular space and the deterioration in efficiency associated therewith can be reduced. However, the drawback of this design is that the annular space is filled with noble gas from the very start, so that, already directly after installation of the solar collector, a lower efficiency is achieved than for the case of an evacuated annular space.

Alternative embodiments, such as, for example, those disclosed in DE 10 2005 057 276 B3, provide for at least one gas-tight sealed tank, filled with at least one noble gas, in the annular space, from which the noble gas is admitted to the annular space once the getter material is exhausted. The drawback of this alternative embodiment is that the solar collector and, in particular, the receiver tube must be fabricated already with a filled tank. Retrofitting is not possible, so that the customer needs to make a decision directly during fabrication of the receiver tube about bearing the extra costs and the increased work effort involved. Another difficulty is presented in opening the tank, which can occur only with increased effort.

A method for opening the tank and for filling the annular space with noble gas is known from DE 10 2011 082 772 B9, wherein the tank is opened by means of a laser drilling method. A laser beam is directed from the outside through the tubular jacket onto the tank, which is irradiated until an opening forms in the tank and the protective gas is released. However, a drawback of this disclosure is also that retrofitting of the receiver tube with the protective gas tank is not possible and the customer needs to bear the increased costs and fabrication effort already during the fabrication, even though the noble gas is employed only a long time after startup.

Thus, at present, no method is known for making it possible to restore in a satisfactory manner the efficiency of a receiver tube that has already suffered losses in performance due to elevated hydrogen pressure in the annular space.

SUMMARY OF THE DISCLOSURE

Therefore, it is the object of the disclosure to provide a method and a device that restore the original efficiency of the receiver tube as effectively and inexpensively as possible.

In one embodiment, the present disclosure provides a method for discharging a hydrogen storage system, which is found in the annular space of a receiver tube, in particular for solar collectors, wherein the annular space is formed at least by an outer-lying tubular jacket and an inner-lying absorber tube of the receiver tube, and the outer-lying tubular jacket is connected by means of a wall to the absorber tube, is hereby characterized in that an opening penetrating through the tubular jacket or the wall is produced, free hydrogen in the annular space is pumped out through the opening, and the opening is subsequently sealed again.

In another embodiment, the present disclosure provides a device for discharging a hydrogen storage system, which is found in the annular space of a receiver tube, in particular for solar collectors, wherein the annular space is formed at least by an outer-lying tubular jacket and an inner-lying absorber tube of the receiver tube, and the outer-lying tubular jacket is connected by means of a wall to the absorber tube, is hereby characterized by a process chamber, means for producing an opening through the tubular jacket or the wall, means for pumping out hydrogen from the annular space, and a means for sealing the opening.

In accordance with the disclosure, the method mentioned initially for discharging a hydrogen storage system provides that, in a first process step, an opening that penetrates the tubular jacket or the wall is produced; that, in a second step, free hydrogen in the annular space is pumped out through the opening; and that, in the third process step, the opening is sealed once again.

As is known from the prior art, hydrogen can be present both in the annular space itself and, under certain circumstances, can be bound by sorption to a getter arranged in the annular space. Consequently, the hydrogen storage system here and in the following comprises both the volume of the annular space itself and, under certain circumstances, a getter also present in the annular space. The total capacity of the hydrogen storage system comprises the absorption capacity of the annular space as well as, when a getter is present in the annular space, the absorption capacity of the getter.

The advantage of the method according to the disclosure is that the annular space of a receiver tube that has already been manufactured and even already installed in a solar collector can be restored afterwards and without great effort in terms of time or cost to a fully functional state, nearly without any losses in efficiency, once the load limit of the getter has been reached. Furthermore, the receiver tube can be supplied with an initially evacuated annular space, so that, even at the start of use, it is possible to realize maximum efficiency. Once the receiver tube manifests losses in efficiency due to hydrogen diffusion, the annular space can be restored again to the original functional state in accordance with the method according to the disclosure. Accordingly, it is also possible, for example in cases in which an irregular mode of operation has led, for example, to an increase in operating temperature or to a contamination of the heat transfer medium, to eliminate efficiently the negative influences of an increased hydrogen permeation.

The cost- and fabrication-intensive installation of an additional tank filled with protective gas is dispensed with. In addition, the annular spaces of already existing equipment can also be restored again to the original functional state at any time by means of the method according to the disclosure. In this way, the lifetime of all receiver tubes is increased, which offers a substantial economic and ecological advantage.

A critical value of potential losses in performance of a receiver tube can be derived, for example, from the hydrogen concentration actually present in the annular space, which is measured by suitable sensors. A temperature measured at the tubular glass jacket is also a suitable indicator, because, with increasing hydrogen concentration, the thermal conductivity of the annular space and hence also the temperature of the tubular glass tube rise during operation. But even before an increase in the temperature of the tubular glass jacket during operation is evident and leads to increased thermal losses, it is possible via determining the state of loading of the getter to determine whether a discharge in the sense of preventive maintenance is necessary. For this purpose, the getter can be heated to various temperature stages using a heater attached on the receiver tube from the outside, and the corresponding characteristic temperature of the tubular jacket can be measured. It is possible from the resulting characteristic curve to determine the load state of the getter material. It is possible in this way to prevent losses in performance.

In an advantageous embodiment of the method according to the disclosure, the opening is created by means of a laser drilling method.

The laser drilling method has the advantage that, in principle, openings of any size and shape can be produced. For this purpose, it is merely necessary to adjust the power and/or geometry of the laser beam to the respective geometry and characteristics of the receiver tubes, tubular jackets, and/or walls. Furthermore, the laser drilling method offers the possibility of producing the opening either in the tubular jacket, which is composed primarily of glass, or in the wall, which is composed primarily of metal or a metal alloy, uniformly and with the same device. In contrast to material-removing drilling processes, a laser drilling method makes it possible to produce openings without any abrasion, as a result of which contamination of the annular space is prevented.

In another advantageous embodiment, the opening is sealed by means of a laser welding method.

The sealing by means of a laser welding method offers the advantage that the opening can be sealed without additional application of a closure material. Furthermore, a laser beam can be adjusted by variation of its power and/or geometry to the most diverse opening geometries and to different requirements, such as, for example, the wall thickness of the tubular jacket or wall or the material compositions thereof.

In a likewise advantageous embodiment, the opening is produced by means of a laser drilling method with a laser beam diameter $d_L1$ and the opening is sealed, after discharge of the hydrogen storage system, by means of a laser welding method with a laser beam diameter $d_L2$, wherein $d_L2$ is greater than $d_L1$.

This embodiment offers the possibility of producing and sealing with only one laser device. When the opening is sealed, it is only necessary to expand the diameter of the laser beam by means of an optical system, for example. Afterwards, the opening is irradiated with the laser beam, the radius of which is greater than the radius of the opening. The result of this is that the material lying around the opening is heated and ultimately melted by absorption. These molten regions subsequently flow into the opening and seal it.

In an alternative and further embodiment according to the disclosure, the opening is sealed using an additional closure material.

Especially in the case of thin-walled tubular jackets or walls, it is possible that insufficient material is available for closure of the opening by melting, so that the stability of the tubular jacket or the wall is not ensured in the region of the sealed opening. In such cases, in accordance with the disclosure, additional material is introduced on or into the opening, as a result of which the opening is sealed and the surrounding material of the tubular jacket or the wall, respectively, is not impaired or is slightly impaired.

Another embodiment according to the disclosure provides that, prior to producing the opening, the additional closure material is applied to the site of the tubular jacket or the wall that is to be opened.

The opening is created all the way through the applied closure material. The closure material thereby has no significant influence on the opening step and pumping-out step. This embodiment also has the advantage that only a small part of the wall material or tubular jacket material needs to be used for closure of the opening. Sufficient additional material is available, so that any adverse effect on the stability of the tubular jacket or/and the wall is prevented and a secure sealing is made possible.

Also advantageous is an embodiment in which the closure material is applied by a soldering, welding, or adhesive method.

Through all of these methods, the closure material is arranged in fixed position on the tubular jacket or the wall, so that the danger of slipping during the opening step or pumping-out step is diminished.

The closure material can also be fixed over the site to be opened by forming the closure material as a disc and designing the walls of a process chamber at their end facing the receiver tube in such a way that they accommodate the disc in a form-fitting manner. This can be produced, for example, by way of lugs or projections that are arranged at the walls and protrude into the chamber. Alternatively, at its end facing the receiver tube, the chamber wall can have a peripheral recess on its inner side in which the disc is accommodated in a form-fitting manner.

The disc is preferably designed as a perforated disc, wherein the perforation corresponds to the cross section of the laser beam during the opening process. As a result, no additional material needs to be melted during the opening process.

The additional closure material is melted after the annular space has been pumped out, and subsequently runs at least partially into the opening so as to seal it.

The closure material can be melted, as described above, by means of a laser beam, the diameter of which is greater than the opening diameter. In addition, it is possible to choose as a closure material a material with a melting point below that of the tubular jacket or the wall, respectively, as a result of which, during melting, markedly less energy is required and the local thermal load of the tubular jacket or wall is reduced further.

If the closure material, as described above, is a perforated disc, the edge region around the perforation opening is melted during sealing by the defocused beam of the laser. The material runs into the opening and seals it. In the process, a weld joint is formed between the disc and the wall. It is possible in this way to hinder any shift in position of the closure material without additional soldering, welding, or adhesive methods.

Additionally advantageous is the use of a closure material that has a high permeability for hydrogen.

It is especially advantageous to use palladium, a palladium alloy, pure iron, or niobium as closure material.

As a result, a selective hydrogen window can be produced when the opening is sealed, and the discharge process can thereby be simplified and accomplished without an additional pumping device, because the hydrogen can escape from the annular space through the selective hydrogen window, while the hydrogen window is impermeable to other gases. Such hydrogen windows are already known from DE 10 2005 022 183 B3, for example. Pure iron represents a cost-effective alternative to palladium, but must, of course, be heated under protective gas.

In another advantageous embodiment of the method according to the disclosure, the opening is produced with at least two different diameters $d_O1$ and $d_O2$, wherein $d_O2$ represents the opening diameter on the side facing away from the absorber tube, and $d_O1$ represents the opening diameter of the side of the tubular jacket or wall facing the absorber tube, wherein the following applies: $d_O2 > d_O1$.

The design of the opening in the form of a stepped drill hole makes possible a secure closure process. As a result of the melting of a closure material at the opening diameter $d_O2$, the closure material runs into the opening region both with smaller diameter and also with larger diameter. This leads to a minimization of potential cavities of the closure material inside the opening and hence also to the minimization of potential admissions of gas.

In an advantageous enhancement of the method according to the disclosure, prior to producing the opening, a process chamber is arranged at the tubular jacket and/or the wall in a gas-tight manner over the site to be opened for pumping out the hydrogen. Arranged at the process chamber are the means for producing and sealing the opening. By way of a suitable pumping process, a vacuum is produced in the chamber and, after producing the opening, the hydrogen is pumped out from the annular space through the opening.

Getter material reacts with the oxygen in air and can be deactivated by it or even combusted at higher temperatures. In any case, however, the absorption capacity of a getter for hydrogen is permanently reduced during interaction with air. Therefore, it is advantageous to carry out each individual process step under as good a vacuum as possible or under a protective gas atmosphere. The vacuum in the chamber ensures first of all that no gas and, in particular, no air can flow into the annular space. The use of a process chamber for which the means for producing and sealing the opening as well as for pumping out the hydrogen from the annular space are arranged is therefore especially advantageous. Any break in the vacuum atmosphere between the different process steps is thereby prevented and the risk of an inflow of air into the annular space is avoided.

Due to the limited diameter of the opening, it is necessary to wait a certain period of time until the hydrogen has exited the annular space through the opening.

Besides the diameter of the opening, this waiting time is also dependent on the pressure differences between the annular space and the process chamber. The pumping-out process can be monitored directly via pressure measurements or via time measurements when the pressure ratios and the diameter of the opening are known.

It is especially advantageous when the hydrogen storage system, as mentioned in the introduction, contains getter material for absorption and storage of hydrogen.

The advantage of using a getter material, as already mentioned, consists in its high absorption capacity for hydrogen.

The absorption capacity of the getter decreases with increasing temperature. An advantageous embodiment of the method according to the disclosure, in which the hydrogen storage system is thermally discharged, makes use of this effect.

As a result of an induced temperature increase of the hydrogen storage system, hydrogen is released from it and the hydrogen partial pressure in the annular space rises. This step is referred to as thermal discharge. At the same time, the thermal conductivity of the annular space is increased by the free hydrogen, which, in turn, speeds up the heating and hence the entire process. The hydrogen that has been released is pumped out through the opening. Consequently, by use of thermal discharge of the hydrogen storage system, it is possible to pump out the hydrogen from the annular space in a shorter time than is possible without thermal discharge.

Advantageously, the receiver tube is heated prior to pumping out and/or during pumping out.

The heating operation can be commenced prior to, during, or after the opening. As a result of the heating operation, the getter temperature is increased and the capacity of the getter is reduced and it therefore releases hydrogen. In the process, the hydrogen storage system can be heated, for example, indirectly via the wall of the receiver tube and/or the tubular jacket by introducing annularly or linearly arranged heating elements and/or inductively. For getters that are mounted at the metal wall of the receiver tube, preferably a contact heater is attached at an outer side of the metal wall lying opposite the annular space. For hydrogen storage systems that are mounted on the absorber tube with a bridge in the annular space, preferably a radiant heater or induction heater is positioned over the bridge.

In another advantageous embodiment, the hydrogen entering through the opening into the process chamber is conveyed away by a mechanical and/or chemical pumping system. In this case, the combination of a mechanical pumping system and an external getter, which is present in a tank coupled to the process chamber in a gas-tight manner, is especially advantageous.

This has the advantage that, at the same time as the discharge process of the annular space, a loading process of the external getter material takes place outside of the annular space. The external getter material is part of the pumping device for pumping out the hydrogen from the annular space and can be used in place of, but preferably supplementary to, a mechanical pump.

Advantageously, the external getter material is again discharged after a certain degree of loading has been attained.

It is further of advantage when the external getter material is loaded and discharged cyclically during the pumping-out process.

It is possible in this way to ensure that the hydrogen is pumped out from the annular space through the opening into the getter tank at constant efficiency, and the getter pump is prevented from operating in the saturation range. Furthermore, the getter pump can be reused after discharge of the external getter for the discharge of further receiver tubes.

After the pumping-out step, the opening is sealed. Subsequently, a test gas can be admitted to the process chamber. This test gas is preferably helium, argon, or xenon. When the process chamber is again pumped, a mass spectrometer can be used to determine whether the opening was sealed in a vacuum-tight manner. If a portion of the test gas penetrates through a leak into the annular gap of the receiver, then, after the chamber has been pumped out, this gas slowly reenters the chamber from the annular gap and can be detected. Once the leakage test has been passed, the process chamber is filled with air and again separated from the receiver tube.

The process chamber can be attached in a detachable manner to the receiver tube and reused several times and for different receiver tubes.

Alternatively, the process chamber can be joined in an undetachable manner to the wall and/or to the tubular jacket, so that, following the pumping-out step, the opening is sealed and, although air is readmitted to the process chamber, the latter is not again separated from the receiver tube.

Besides relating to a method, the disclosure also relates to a device for discharging a hydrogen storage system in the annular space of a receiver tube, said device being referred to below as a "discharge device," wherein the annular space is formed at least from an outer-lying tubular jacket and an inner-lying absorber tube of the receiver tube, and the outer-lying tubular jacket is joined to the absorber tube by means of a wall, and the device includes a process chamber, which, together with the wall or the tubular jacket, forms a cavity, a means for producing an opening through the tubular jacket or the wall, a means for pumping out hydrogen from the annular space, and a means for sealing the opening.

This disclosure offers the advantages explained above in connection with the method according to the disclosure.

In an advantageous embodiment, the process chamber has at least one outlet opening at which the means for evacuating the process chamber or for pumping out the hydrogen from the annular space and the process chamber can be attached, as well as at least one through-opening for attaching the means for producing and sealing an opening through the tubular jacket or the wall of a receiver tube.

In an advantageous enhancement of the device according to the disclosure, the means for producing and/or for sealing an opening through the tubular jacket or the wall is constituted by a laser system.

A laser system offers the possibility of producing openings through the tubular jacket or the wall with the most diverse diameters and geometries rapidly and without machining residues. Detailed advantages of a laser system have already been explained in connection with the description of the method according to the disclosure.

An advantageous embodiment of the device according to the disclosure has means for thermally discharging the hydrogen storage system, said means having already been explained in the course of the description of the method according to the disclosure.

Especially advantageous is the use of a heating device arranged at the receiver tube on the outside, for example in the form of annularly or linearly arranged heating elements.

Depending on the positioning and fixing in place of a getter that is arranged, under certain circumstances, in the annular space, different embodiments of the heating device can be advantageous. For getters that are attached to the metal wall of the receiver tube, for example, preferably a contact heater is attached to an outer side of the metal wall lying opposite the annular space. For hydrogen storage systems that are mounted in the annular space (directly) on the absorber tube with a bridge, preferably a radiant heater or, if a metal bridge is present, an induction heater is positioned in alignment on the bridge The means for pumping out the hydrogen from the annular space is advantageously formed by a mechanical and/or chemical pumping system.

Particularly advantageous is the combination of a mechanical pumping system and a getter pump attached to the process chamber in a gas-tight manner.

The advantages of a getter pump that is used in place of, but preferably supplementary to, a mechanical pump, have already been explained in the course of the description of the method according to the disclosure.

In an advantageous enhancement of the device according to the disclosure, a support system is provided in addition to the process chamber, said support system absorbing all mechanically acting forces of the laser, the pumps, etc. that are joined to the support system, so that the sealing of the process chamber to the wall or the tubular jacket is subjected to a markedly lower mechanical load.

Advantageously, the process chamber is equipped with a vacuum-tight window that is transparent for the laser beam. In addition, it is possible to attach a corrugated hose connection between the optics of the laser and the window so as to achieve a complete encapsulation of the laser beam path.

The process chamber can additionally have a protective glass, which is arranged between the laser window and the site of the receiver tube that is to be opened, and which is preferably mounted in a rotatable manner, and protects the laser window against vapor deposition during the opening process.

Further features, advantages, and exemplary embodiments of the method and of the device for discharging a hydrogen storage system in parabolic trough receivers will be explained below on the basis of the description of figures.

DETAILED DESCRIPTION OF THE DISCLOSURE

Figure 1A:
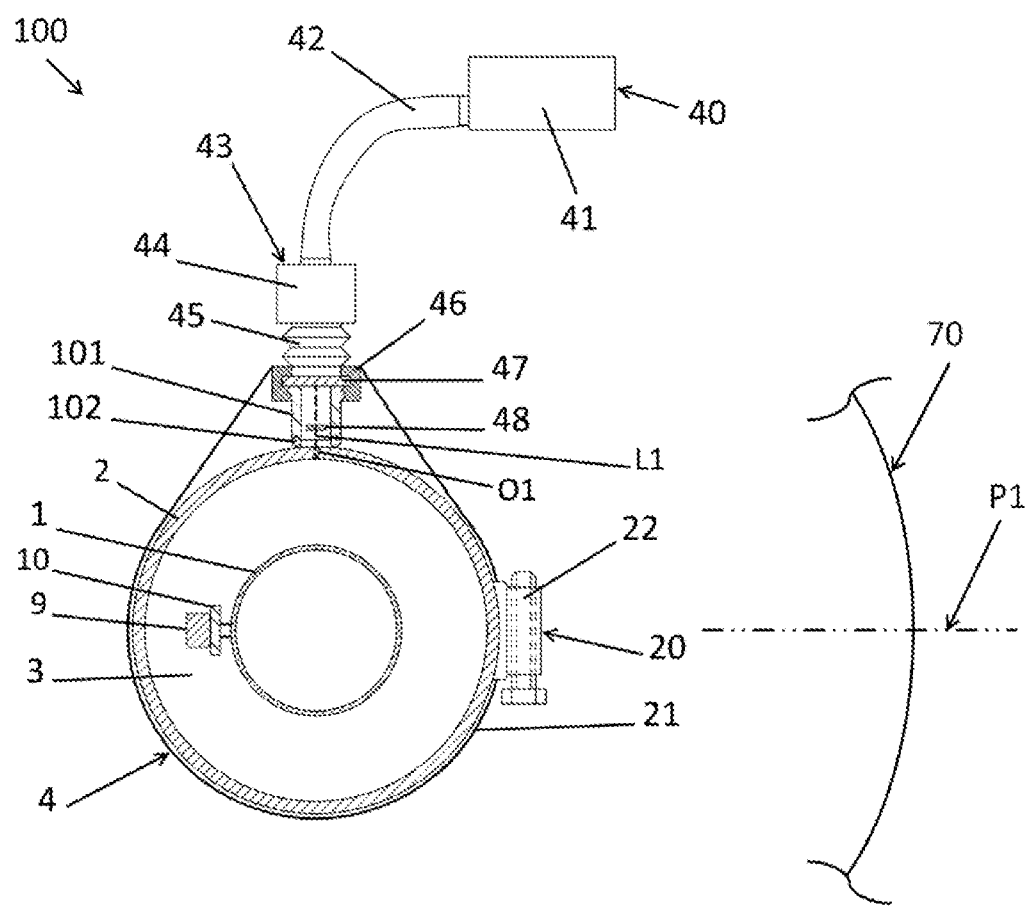
FIG. 1a is a first embodiment of the discharge device in cross section after producing an opening.
Figure 1B:
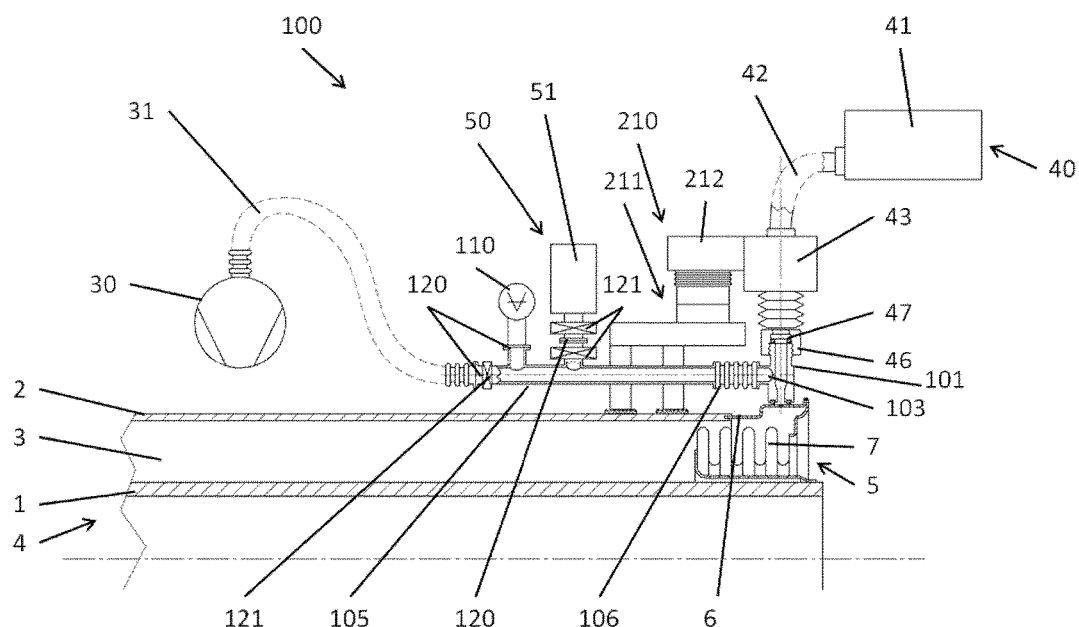
FIG. 1b is a first embodiment of the discharge device in lengthwise section.

Illustrated in FIGS. 1a and 1b is a first embodiment of the discharge device 100 according to the disclosure. This device has a process chamber 101, which is arranged on a receiver tube 4, which is situated at the focal point of a parabolic trough 70. The receiver tube 4 has an absorber tube 1 and a tubular jacket 2, wherein an annular space 3 is formed between the absorber tube 1 and the tubular jacket 2. The outer-lying tubular jacket 2 is joined via a wall 5 to the absorber tube 1. The wall 5 contains a glass-metal transition element 6, which is illustrated in FIG. 1b, as well as an expansion compensating element 7.

A getter 9 is arranged on a getter bridge 10 in the annular space 3, as illustrated schematically in FIG. 1a, said getter bridge being fastened to the absorber tube 1. Usually, the getter 9 in such an embodiment is arranged on the parabolic axis P1 intersecting the focal point and on the side of the absorber tube 1 lying opposite to the parabolic trough 70.

The process chamber 101 is fastened by means of a fastening system 20 to a peripheral part of the wall 5 in the region of the glass-metal transition element 6 in a gas-tight manner. Alternatively, the process chamber can be fastened on the tubular jacket 2. The fastening system 20 is composed of a clamp 21 and a closure 22 and is arranged on the process chamber 101 such that, when the clamp 21 is tightened, a homogenous applied pressure is produced. In order to be able to attach the process chamber 101 rapidly and detachably to various receiver tubes 4 with different diameters of the tubular jacket 2 or the wall 5, the peripheral size of the clamp 21 can be variably adjusted by means of the closure 22. Alternatively to a clamp 21, it is also possible to use a rubber band, a tension strap, or a belt for fixing the process chamber 101 in place on the receiver tube 4.

In order to produce a gas-tight connection between the process chamber 101 and the receiver tube 4, a seal is attached to the corresponding contact surface of the process chamber 101. In this exemplary embodiment, the seal is formed in the shape of a seal ring 102. When the clamp 21 is tightened, the seal ring 102 and the process chamber 101 are pressed against the receiver tube 4 in such a way that a gas-tight connection is created.

The process chamber 101 has an outlet opening 103. Via a connection system, which is designed as a connection tube 105 schematically in FIG. 1b, the process chamber 101 is in fluid connection with means for evacuating and pumping out the process chamber 101 and the annular space 3 as well as with a sensor 110. Inserted between the connection tube 105 and the process chamber 101 for the purpose of mechanical decoupling is a flexible, vacuum-tight hose element 106. For this purpose, the connection tube 105 has junctions, which are indicated in FIG. 1b as flanges 120. In the exemplary embodiment presented in FIGS. 1a and 1b, the above-mentioned means for evacuating and pumping out is constituted by a vacuum pump 30 and a getter pump 50, wherein the vacuum pump 30 in FIG. 1b is connected to the connection tube 105 by means of a vacuum hose 31. The getter pump 50 is composed of a getter tank 51, which contains an external getter for the discharge process explained in the preceding description. Valves 121 enable the vacuum in the process chamber to be maintained when the vacuum pump 30 and/or the getter pump 50 are or is decoupled from the connection tube 105. The illustration of the connection system as a connection tube 105 is not to be understood as being limiting. Also conceivable are other design variants, which enable the process chamber 101 to be evacuated or the annular space 3 to be pumped out to a few millibars. For example, another combination of tube elements and flexible connections for mechanical decoupling of the process chamber 101 from the pumps (30, 50) and/or the sensor 110 can be used.

The process chamber 101 has a through-opening 104. The through-opening 104 is equipped by means of screw connection 46 with a gas-tight laser window 47 that is transparent for a laser. A laser system is arranged above the laser window 47. The laser system 40 has a laser source 41 in the form of a laser diode or solid-state laser, for example. This laser source 41 is connected by means of a light guide 42 with a laser head 43, an optical system 44, and a focusing unit 45. In addition, a protective glass 48 is attached in the process chamber 101, said protective glass being preferably rotatable and protecting the laser window against vapor deposition during producing and sealing the opening O1.

The connection tube 105 is fastened to a support system 210, which absorbs the mechanically acting forces and, together with the hose element 106, relieves the sealing of the process chamber 101 at the wall 5 or the tubular jacket 2. The support system 210 has a support base 211, to which the connection tube 105 is fastened, with a support arm 212 being arranged movably at the support base 211. The support arm is joined rigidly to the laser head 43. In this way, the laser can be brought into the position necessary for producing and sealing the opening O1 and fixed in place there.

Figure 2A:
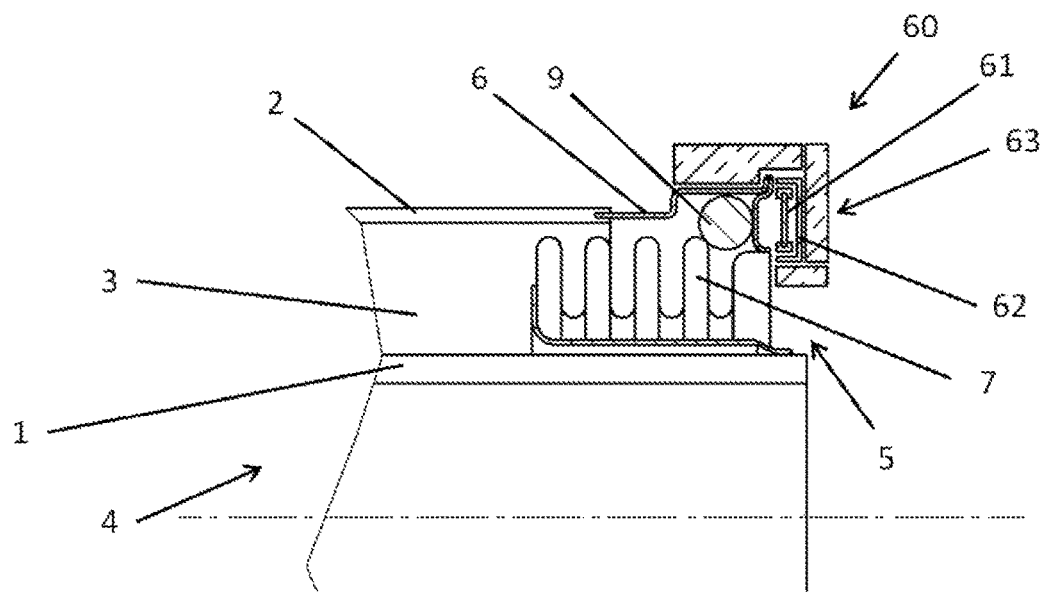
FIG. 2a is a first variant of a heating device for discharging a getter present in the annular space and arranged in the wall of the receiver tube.
Figure 2B:
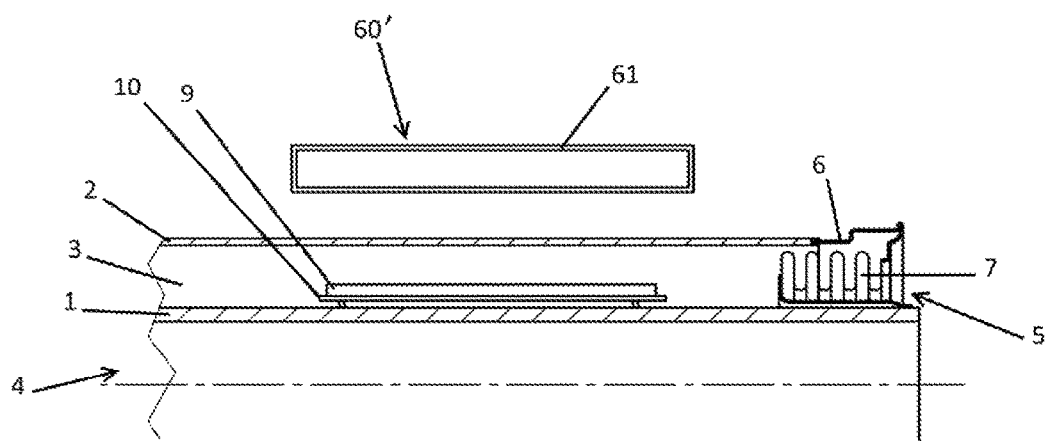
FIG. 2b is a second variant of a heating device for discharging a getter present in the annular space and arranged on a getter bridge at the absorber tube.

Schematically illustrated in FIGS. 2a and 2b are different embodiments of a heating device 60, which vary depending on the position of a getter 9 present in the annular space 3.

If the getter 9, as shown in FIG. 2a, is arranged, for example, annularly at the wall 5 of the receiver tube 4, then a contact heater on the outer side of the metal wall 5 is offered. For this purpose, a heating element 61 and a housing 62, which can also have an annular design, are mounted at the wall 5. The housing 62 and the heating element 61 as well as the section of the wall 5 surrounding the getter 9 are surrounded by an insulation 63, which reduces any heat loss.

If, on the other hand, the getter 9, as illustrated in FIGS. 1a and 2b, is arranged on a getter bridge 10, which is fastened on the absorber tube 1, then a radiant heater and/or induction heater are or is especially suitable. In this case, the heating device 60' is arranged outside of the receiver tube 4 and is aligned so that the radiation of energy is directed onto the getter 9 by means of suitable reflectors, for example. When the method according to the disclosure is carried out, the parabolic trough 70 is readily accessible in a maintenance position in the receiver tube 4—for example, in a "9 o'clock position" in relation to the illustrated position of the getter 9. Because the getter 9, as described above and as shown in FIG. 1a, is situated on the parabolic axis P1 of the parabolic trough 70, it is possible, in the maintenance position of the parabolic trough 70, for the heating device 60 and the process chamber 101 to be arranged at angular offset in cross section.

The various process steps for discharging the hydrogen storage system of a receiver tube 4 will be explained on the basis of the figures by means of an embodiment of the discharge device 100.

As can be seen in FIG. 1a, in a first step, the discharge device 100, composed of the process chamber 101, the vacuum pump 30, the laser system 40, and the getter pump 50, is arranged by means of fastening system 20 on a receiver tube 4 and, in particular, on its wall 5 or tubular jacket 2. In the process, the seal ring 102 forms preferably the sole contact between the process chamber 101 and the wall 5 or the tubular jacket 2, respectively Subsequently, the fastening system 20 is tightened, so that the process chamber 101 is pressed against the glass-metal transition element 5. If the fastening system 20 is formed by a clamp 21, for example, then the tightening takes place by adjustment of the closure 22.

Once the process chamber 101 has been placed on the tubular jacket 2 or the wall 5 in a gas-tight manner, the interior thereof is subsequently evacuated by means of vacuum pump 30 via the outlet opening 103 and the connection tube 105. This occurs until pressures of about $10^{-3}$ to $10^{-2}$ mbar prevail in the process chamber 101. As a result of this evacuation, the interior of the process chamber 101 is freed of foreign substances, which could otherwise lead to contamination of the annular space 3 during the later opening of the tubular jacket 2 or the wall 5.

Once the process chamber 101 has been evacuated, an opening O1 is produced through the wall 5 or directly through the tubular jacket 2 by means of the laser system 40. For this purpose, a laser beam produced in the laser source 41 is guided via the laser head 43 and the through-opening 104 along an axis L1 into the process chamber 101 and onto the surface of the tubular jacket 2 or the wall 5.

Once the wall 5 or the tubular jacket 2, respectively, has been drilled through by means of the laser beam, the hydrogen that is released through the opening O1 is pumped off by means of the vacuum pump 30 until a defined pressure is attained in the annular space. Alternatively, the mechanical vacuum pump 30, which was previously used for evacuation of the process chamber 101, can be separated from the process chamber 101, and a getter pump 50, attached to the process chamber 101, can be activated for pumping out the hydrogen. In order to speed up the pumping-out step, the getter material 9, arranged in the annular space 3, is heated by the heating device 60 attached to the receiver tube 4 from the outside. It is possible to commence the heating operation already prior to pumping out.

Subsequent to the pumping out, the opening O1 is again sealed. For this purpose, the laser beam is expanded by way of the optical system 44 and the focusing unit 45 until, at the focal point, it has a larger diameter than the opening O1 and no longer has the energy density to vaporize the material of the tubular jacket 2 or the wall 5, but instead merely melts said material. For sealing the opening O1, the expanded laser beam is radiated along the axis L1 onto the opening O1. The result of this is that the edges of the opening O1 soften and ultimately melt. The molten material flows into the opening O1 and seals it, as a result of which the annular space 3 and the process chamber 101 are again spatially separated from each other.

In a last step, the fastening system 20 is released, as a result of which the discharge apparatus 100 can be removed completely from the receiver tube 4.

While the present disclosure has been described with reference to one or more particular embodiments, it will be understood by those skilled in the art that various changes may be made and equivalents may be substituted for elements thereof without departing from the scope thereof. In addition, many modifications may be made to adapt a particular situation or material to the teachings of the disclosure without departing from the scope thereof. Therefore, it is intended that the disclosure not be limited to the particular embodiment(s) disclosed as the best mode contemplated for carrying out this disclosure.

LIST OF REFERENCE CHARACTERS 1 absorber tube
2 tubular jacket
3 annular space
4 receiver tube
5 wall
6 glass-metal transition element
7 expansion compensating element
9 getter
10 getter bridge
20 fastening system
21 clamp 22 closure
30 vacuum pump
31 vacuum hose
40 laser system
41 laser source
42 light guide
43 laser head
44 optical system
45 focussing system
46 screw connector
47 laser window
48 protective glass
50 external getter pump
51 getter tank
60 heating device
61 heating element
62 housing
63 insulation
70 parabolic trough
100 discharge device
101 process chamber
102 seal
103 outlet opening
104 through-opening
105 connection tube
106 flexible hose element
110 sensor
120 flange
121 valve
210 support system
211 support base
212 support arm
O1 opening
L1 axis
P1 parabolic axis

What is claimed is:

1. A method for discharging a hydrogen storage system, wherein the hydrogen storage system is in the annular space of a receiver tube, wherein the annular space is defined at least by an outer-lying tubular jacket and an inner-lying absorber tube of the receiver tube, and wherein the outer-lying tubular jacket is connected by a wall to the absorber tube, the method comprising the steps of:
producing an opening penetrating through the tubular jacket or the wall;
pumping free hydrogen in the annular space out through the opening; and
subsequently sealing the opening.

2. The method according to claim 1, wherein the opening is produced via laser drilling.

3. The method according to claim 1, wherein the opening is sealed by via laser welding.

4. The method according to claim 1, wherein the opening is produced via laser drilling with a laser beam diameter $d_L1$, and the opening is sealed via laser welding with a laser beam diameter $d_L2$, wherein the following applies: $d_L2 > d_L1$.

5. The method according to claim 1, wherein the opening is sealed with a closure material.

6. The method according to claim 5, further comprising the step of applying the closure material to a site of the opening prior to the producing step.

7. The method according to claim 5, wherein the closure materials comprises a material with hydrogen permeability.

8. The method according to claim 5, wherein the closure material is selected from the group consisting of palladium, a palladium alloy, pure iron, and niobium.

9. The method according to claim 1, further comprising the step of, prior to the producing step, arranging a process chamber at the tubular jacket and/or the wall in a gas-tight manner over a site of the opening for pumping out the hydrogen.

10. The method according to claim 1, wherein the hydrogen storage system contains getter material.

11. The method according to claim 1, wherein the hydrogen storage system is thermally discharged.

12. The method according to claim 11, further comprising the step of heating the receiver tube prior to or during the pumping step.

13. The method according to claim 9, wherein the free hydrogen enters the process chamber during the pumping step, and is bound by an external getter material, and wherein the getter material is in a tank coupled to the process chamber in a gas-tight manner.

14. The method according to claim 13, wherein the external getter material is discharged after reaching a specific degree of loading.

15. The method according to claim 13, wherein the external getter material is cyclically loaded and discharged during the pumping step.

16. A device for discharging a hydrogen storage system, wherein the hydrogen storage system is in the annular space of a receiver tube, wherein the annular space is defined at least by an outer-lying tubular jacket and an inner-lying absorber tube of the receiver tube, and wherein the outer-lying tubular jacket is connected with a wall to the absorber tube, the device comprising:
a process chamber;
a laser driller for producing an opening through the tubular jacket or the wall;
a pump for pumping out hydrogen from the annular space; and
a sealer for sealing the opening.

17. The device according to claim 16, wherein the process chamber has at least one outlet opening for evacuating and/or pumping out the hydrogen from the process chamber and at least one through-opening for the laser driller and/or the sealer through the tubular jacket or the wall.

18. The device according to claim 16, wherein sealer is a laser system.

19. The device according to claim 16, further comprising a heater for inducing thermal discharge of the hydrogen storage system.

20. The device according to claim 19, wherein the heater is on the outside of the receiver tube.

21. The device according to claim 16, further wherein the pump is a mechanical and/or chemical pump.

22. The device according to claim 21, wherein the chemical pump is a getter pump.

* * * * *